United States Patent
Guan

(10) Patent No.: US 12,050,901 B2
(45) Date of Patent: Jul. 30, 2024

(54) OVER-THE-AIR UPDATING METHOD, UPDATE SERVER, TERMINAL DEVICE, AND INTERNET OF THINGS SYSTEM

(71) Applicant: BOE Technology Group Co., Ltd., Beijing (CN)

(72) Inventor: Hongtao Guan, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 60 days.

(21) Appl. No.: 17/778,193

(22) PCT Filed: Jun. 23, 2021

(86) PCT No.: PCT/CN2021/101769
§ 371 (c)(1),
(2) Date: May 19, 2022

(87) PCT Pub. No.: WO2021/259310
PCT Pub. Date: Dec. 30, 2021

(65) Prior Publication Data
US 2023/0107953 A1    Apr. 6, 2023

(30) Foreign Application Priority Data
Jun. 23, 2020  (CN) .............................. 202010582268

(51) Int. Cl.
*G06F 8/65*  (2018.01)
*G06F 21/64*  (2013.01)
(Continued)

(52) U.S. Cl.
CPC ................ *G06F 8/65* (2013.01); *G16Y 10/75* (2020.01); *G16Y 40/50* (2020.01); *H04L 9/3073* (2013.01); *H04W 12/037* (2021.01)

(58) Field of Classification Search
CPC .......... G06F 8/65; G06F 21/64; G16Y 10/75; G16Y 40/50; H04L 9/3073;
(Continued)

(56) References Cited

U.S. PATENT DOCUMENTS

2002/0013897 A1* 1/2002 McTernan ............... H04L 69/22
                                                                        713/153
2004/0107349 A1* 6/2004 Sasselli ................. H04L 9/3247
                                                                        348/E7.054
(Continued)

FOREIGN PATENT DOCUMENTS

| CN | 106201607 A | 12/2016 |
| CN | 108563927 A | 9/2018 |

(Continued)

OTHER PUBLICATIONS

PCT/CN2021/101769 international search report and written opinion.

*Primary Examiner* — Darren B Schwartz
(74) *Attorney, Agent, or Firm* — IPro, PLLC

(57) ABSTRACT

An over-the-air updating method, an update server, a terminal, and an internet of things system are provided. The over-the-air updating method is applied to an update server in an internet of things system which further includes a terminal. The update server is communicatively connected to the terminal. The method includes: generating an encryption public key and an encryption private key which match each other; sending the encryption public key to the terminal; generating an update key, and encrypting the update key with the encryption private key; sending the encrypted update key to the terminal, for the terminal decrypts the encrypted update key with the encryption public key; encrypting update data with the update key; sending the encrypted update data to the terminal, for the terminal (Continued)

decrypts the update data with the decrypted update key, and performing data updating with the update data.

11 Claims, 4 Drawing Sheets

(51) Int. Cl.
    *G16Y 10/75*            (2020.01)
    *G16Y 40/50*            (2020.01)
    *H04L 9/08*              (2006.01)
    *H04L 9/14*              (2006.01)
    *H04L 9/30*              (2006.01)
    *H04L 67/125*          (2022.01)
    *H04W 4/70*            (2018.01)
    *H04W 8/24*            (2009.01)
    *H04W 12/02*          (2009.01)
    *H04W 12/037*         (2021.01)
    *H04W 12/0433*        (2021.01)
    *H04W 12/10*          (2021.01)

(58) Field of Classification Search
CPC ............. H04L 2209/805; H04L 9/0822; H04L 9/0825; H04L 9/0861; H04L 9/14; H04L 9/0891; H04L 67/125; H04W 12/037; H04W 4/70; H04W 8/24; H04W 12/02; H04W 12/0433; H04W 12/10; H04W 8/245

See application file for complete search history.

(56) References Cited

U.S. PATENT DOCUMENTS

| | | | |
|---|---|---|---|
| 2004/0175000 A1* | 9/2004 | Caronni | G06F 21/6218 380/285 |
| 2007/0201702 A1* | 8/2007 | Hendricks | G06F 21/10 380/282 |
| 2007/0217611 A1* | 9/2007 | Weis | H04L 9/083 380/277 |
| 2017/0068530 A1* | 3/2017 | Berrange | H04L 67/34 |
| 2018/0082076 A1* | 3/2018 | Murray | H04L 63/10 |
| 2018/0107997 A1 | 4/2018 | Dhankani et al. | |
| 2019/0266347 A1* | 8/2019 | Indukuri | G06F 21/6245 |
| 2021/0117577 A1* | 4/2021 | Robitaille | G06F 21/53 |

FOREIGN PATENT DOCUMENTS

| | | |
|---|---|---|
| CN | 109214168 A | 1/2019 |
| CN | 109495307 A | 3/2019 |
| CN | 109857421 A | 6/2019 |
| CN | 109992286 A | 7/2019 |
| CN | 112929871 A | 6/2021 |

\* cited by examiner

OVER-THE-AIR UPDATING METHOD, UPDATE SERVER, TERMINAL DEVICE, AND INTERNET OF THINGS SYSTEM

CROSS-REFERENCE TO RELATED APPLICATIONS

The present application is the U.S. national phase of PCT Application No. PCT/CN2021/101769 filed on Jun. 23, 2021, which claims priority to Chinese Patent Application No. 202010582268.6 filed in China on Jun. 23, 2020, the disclosure of which is incorporated hereby by reference in its entirety.

TECHNICAL FIELD

The present disclosure relates to the technical field of internet of things, and in particular, to an over-the-air updating method, an update server, a terminal device, and an internet of things system.

BACKGROUND

A firmware for a terminal product of internet of things often needs to be updated for the iterations for the terminal product, and The Over-The-Air (OTA) technology is widely used because it is convenient and time-saving. However, the OTA updating method brings risks in the data security although it is convenient, there is a risk that the firmware data are monitored and intercepted through the wireless module, resulting in an illegal theft of the firmware. Therefore, the existing over-the-air updating method has a low security.

SUMMARY

In a first aspect, embodiments of the present disclosure provide an over-the-air updating method, applied to an update server in an internet of things system, where the internet of things system includes the update server and a terminal device, and the update server is communicatively connected to the terminal device, and the method includes the following steps:
  generating an encryption public key and an encryption private key that match with each other;
  sending the encryption public key to the terminal device;
  generating an update key, and encrypting the update key with the encryption private key;
  sending the encrypted update key to the terminal device, to cause the terminal device to decrypt the encrypted update key with the encryption public key;
  encrypting update data with the update key; and
  sending the encrypted update data to the terminal device, to cause the terminal device to decrypt the update data with the decrypted update key, and perform a data updating with the update data.

Optionally, before sending the encrypted update data to the terminal device, the updating method further includes:
  generating first integrity check data corresponding to the update data; and
  sending the first integrity check data to the terminal device.

Optionally, the updating method further includes: receiving a heartbeat packet sent periodically by the terminal device, and sending the encryption public key to the terminal device upon receiving the heartbeat packet of the terminal device by the update server.

Optionally, after encrypting the update key with the encryption private key, the update server sends the encrypted update key to the terminal device upon receiving the heartbeat packet sent by the terminal device.

In a second aspect, embodiments of the present disclosure provide an over-the-air updating method, applied to a terminal device in an internet of things system, where the internet of things system includes a update server and the terminal device, and the update server is communicatively connected to the terminal device, and the method includes the following steps:
  receiving an encryption public key sent by the update server;
  receiving an update key sent by the update server, where the update key is encrypted by the update server with an encryption private key matching the encryption public key;
  decrypting the encrypted update key with the encryption public key;
  receiving update data sent by the update server, where the update data is encrypted by the update server with the update key;
  decrypting the update data with the decrypted update key; and
  performing a data updating with the update data.

Optionally, after decrypting the update data with the decrypted update key, the updating method further includes the following steps:
  calculating second integrity check data of the decrypted update data;
  performing an integrity check on the update data according to first integrity data and second integrity data, where the first integrity check data is generated by the update server according to the update data and sent to the terminal device. Optionally, the performing the data updating with the update data includes:
  performing the data updating with the update data in a case that the update data passes the integrity check.

Optionally, the updating method further includes periodically sending a heartbeat packet to the update server.

In a third aspect, embodiments of the present disclosure also provide an update server applied to an internet of things system, where the internet of things further includes a terminal device, the update server is communicatively connected to the terminal device, and the update server includes:
  a first generation module, configured to generate an encryption public key and an encryption private key that match with each other;
  a first sending module, configured to send the encryption public key to the terminal device;
  a first encryption module, configured to generate an update key, and encrypt the update key with the encryption private key;
  a second sending module, configured to send the encrypted update key to the terminal device to cause the terminal device to decrypt the encrypted update key with the encryption public key;
  a second encryption module, configured to encrypt update data with the update key; and
  a third sending module, configured to send the encrypted update data to the terminal device, to cause the terminal device to decrypt the update data with the decrypted update key and perform a data updating with the update data.

Optionally, the update server further includes:
a second generation module, configured to generate first integrity check data corresponding to the update data; and
a fourth sending module, configured to send the first integrity check data to the terminal device.

Optionally, the first sending module is configured to send the encryption public key to the terminal device upon receiving a heartbeat packet of the terminal device.

Optionally, the second sending module is configured to send the encrypted update key to the terminal device upon receiving the heartbeat packet sent by the terminal device.

In a fourth aspect, embodiments of the present disclosure also provide a terminal device applied to an internet of things system, where the internet of things system further includes an update server, and the update server is communicatively connected to the terminal device, and the terminal device includes:

a first receiving module, configured to receive an encryption public key sent by the update server;
a second receiving module, configured to receive an update key sent by the update server, where the update key is encrypted by the update server with an encryption private key matching the encryption public key;
a first decryption module, configured to decrypt the encrypted update key with the encryption public key;
a third receiving module, configured to receive update data sent by the update server, where the update data is encrypted by the update server with the update key;
a second decryption module, configured to decrypt the update data with the decrypted update key; and
an updating module, configured to perform a data updating with the update data.

Optionally, the terminal device further includes:
a calculation module, configured to calculate second integrity check data of the decrypted update data; and
a check module, configured to perform an integrity check on the update data according to first integrity data and the second integrity data, where the first integrity check data is generated by the update server according to the update data and sent to the terminal device.

Optionally, the terminal device further includes a sending module, configured to periodically send a heartbeat packet to the update server.

In a sixth aspect, embodiments of the present disclosure also provide an internet of things system, including the update server described above and the terminal device described above.

BRIEF DESCRIPTION OF THE DRAWINGS

To give a clear illustration of embodiments of the present disclosure, provided below is a brief description of the accompany drawings for the description of the embodiments of the present disclosure. Apparently, the drawings are only some embodiments of the present disclosure, other drawings can also be obtained by those skilled in the art according to these drawings without any creative effort.

DETAILED DESCRIPTION

The technical solution in embodiments of the present disclosure will now be described clearly hereinafter in conjunction with the accompanying drawings. Apparently, the described embodiments are only some, rather than all embodiments of the disclosure. Based on the embodiments of the present disclosure, all other embodiments obtained by a person of ordinary skill in the art without any creative effort fall within the protection scope of the present disclosure.

The present disclosure provides an OTA (over-the-air downloading, Over The Air) updating method applied to an internet of things system, where the internet of things system includes an update server and terminal device, the update server and the terminal device are communicatively connected, so that update data can be transmitted from the update server to the terminal device by means of OTA.

Figure 1:
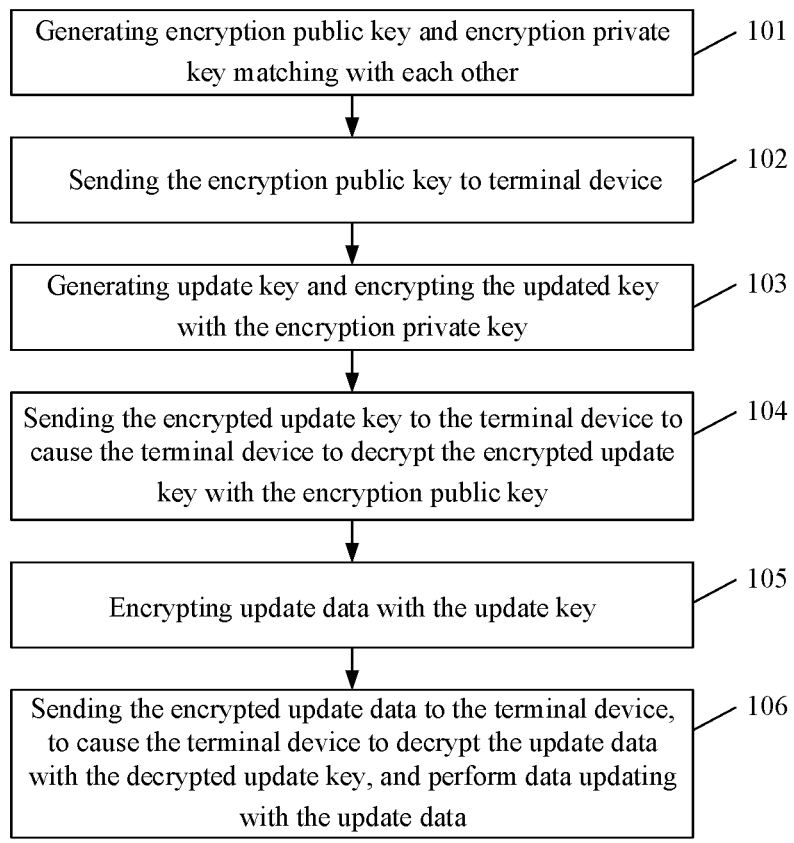
FIG. 1 is a flow chart of an OTA updating method provided by an embodiment of the present disclosure.
Figure 2:
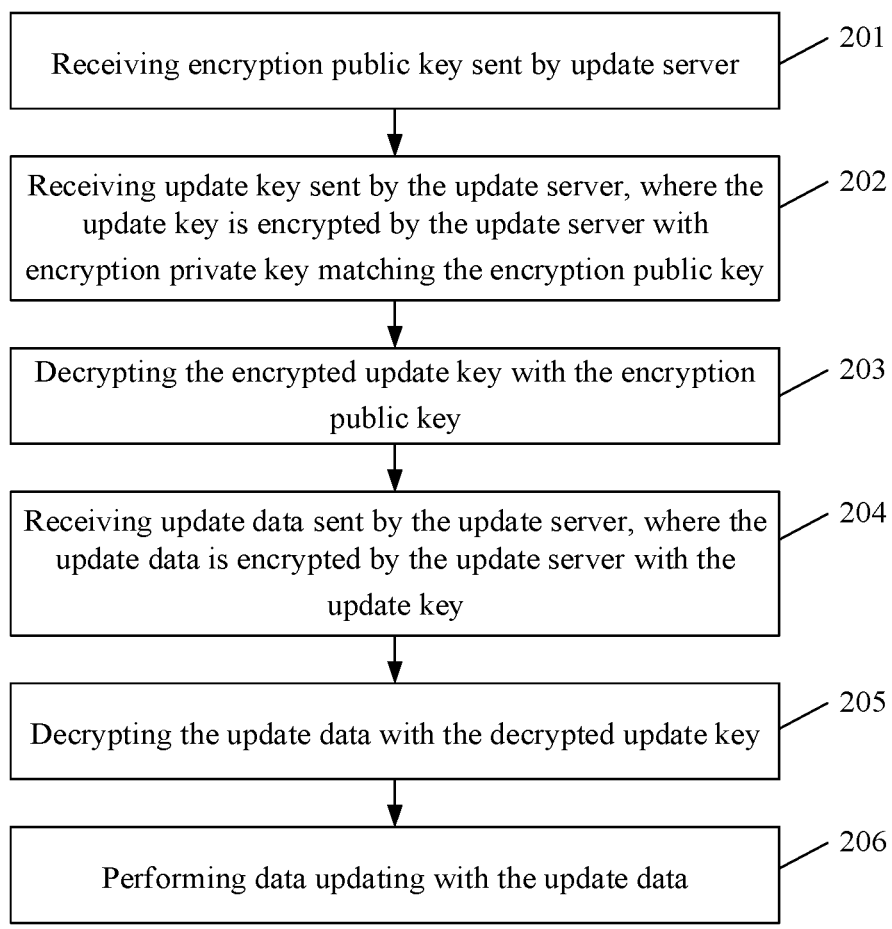
FIG. 2 is another flow chart of an OTA update method provided by an embodiment of the present disclosure.

As shown in FIG. 1, in an embodiment, the OTA updating method includes the following steps 101 to 106 which are performed in the update server.

Step 101: generating an encryption public key and an encryption private key matching the encryption public key.

In the update server, the encryption public key and the encryption private key matching the encryption public key are generated by using an asymmetric encryption algorithm such as an RSA algorithm.

In practice, fixed public and private encryption keys may be used. In order to improve the security, additionally, the encryption public key and the encryption private key may be periodically updated. Specifically, the encryption private key and the encryption public key may be periodically replaced. For example, the validity period of each group of the encryption public key and the encryption private key is set to a duration such as one week or ten days, and said group of the encryption public key and the encryption private key is only valid within the validity period. For another example, a group of public encryption key and private encryption key matching the public encryption key, which group is different from the former group, may be randomly generated in the update server every time when the OTA updating is performed, so as to improve the security of the updating.

Step 102: sending the encryption public key to the terminal device.

After establishing the connection between the terminal device and the update server, the update server sends the encryption public key to the terminal device. Specifically, the update server sends the encryption public key upon receiving a heartbeat packet from the terminal device.

The heartbeat packet may be sent periodically by the terminal device to the server, which is for maintaining a persistent connection between the terminal device and the server in general. In the present embodiment, for example, a heartbeat request may be sent by the terminal device to the server end through the persistent connection channel every predetermined period, and the encryption public key is included in the heartbeat request.

Step 103: generating an update key, and encrypting the update key with the encryption private key.

It should be understood that the step 103 may be performed after step 102 or before step 102.

In practice, the update key is generated by a symmetric encryption such as an AES (Advanced Encryption Standard) in the update server, and the update key is encrypted with the encryption private key.

Step 104: sending the encrypted update key to the terminal device for the terminal device to decrypt the encrypted update key with the encryption public key.

Since the update key is sent to the terminal device after it is encrypted, in this process, an unauthorized user can only obtain an encrypted update key even if the unauthorized user acquires the update key illegally.

After receiving the encrypted update key, the terminal device can decrypt the update key with the encryption public key to obtain the real update key.

In this manner, the possibility that the update data are stolen is reduced by encrypting the update key, which is in favor of improving security.

In embodiments of the present disclosure, the update server may send the encrypted update key to the terminal for internet of things when receiving the heartbeat packet sent by the terminal.

Step 105: encrypting the update data with the update key.

When the update data needs to be issued to the terminal device, the update data is encrypted with an unencrypted update key. In this manner, the unauthorized user can only obtain the encrypted update data even if the unauthorized user acquires the update data illegally during the transmission of the update data, which reduces the possibility of the update data leakage It should be understood that step 105 can be performed at any time after the update key is generated and before the update data is sent to the terminal device. For example, step 105 may be performed before or after step 104.

Step 106: sending the encrypted update data to the terminal device, for the terminal device to decrypt the update data with the decrypted update key, and performs a data updating with the update data.

After the update data is encrypted, the encrypted update data is sent to the terminal device. The terminal device first decrypts the update key with the encryption public key, and then decrypts the update data with the decrypted update key. Afterwards, the terminal device performs the data updating with the obtained update data.

As an optional embodiment, optionally, before sending the encrypted update data to the terminal device, the method further includes:

generating first integrity check data corresponding to the update data;

sending the first integrity check data to the terminal device.

The first integrity data may be obtained by calculating an MD5 value of the update data using an MD5 algorithm (Message-Digest Algorithm 5). Since the MD5 value is unique, the MD5 value calculated for the same file is the same. Thus, for the same update data, the MD5 value calculated in the update server and the MD5 value in the terminal device are the same.

In this way, the first integrity check data of the update data calculated in the update server are then sent to the terminal device, and furthermore, the integrity data of the received update data is calculated in the terminal device and compared with the first integrity check data. The update data received by the terminal device are proved to have no problem if the two integrity check data are consistent. Otherwise, the received update data are proved to be damaged or tampered, and in this case, the update server needs to re-issue the correct update data to the terminal device.

By calculating the first integrity check data of the update data and sending the same to the terminal device, it can be ensured that the terminal device receives the correct update data, which reduces the possibility of an update error.

Thus, in the embodiments of the present disclosure, the update data is encrypted with the update key, and the update key of the update data is further encrypted with the encryption private key at the update server end. The update data is decrypted with the encryption public key at the terminal device end. In the case where the update data is lost, it is also possible to avoid other illegal users to directly acquire the update data, which is in favor of reducing the possibility of the update data leakage.

Since the update data is encrypted with the update key, and the update key is also encrypted the matched encryption public key and encryption private key, the update data cannot be directly decrypted to obtain the update data even if the unauthorized user obtains the update key but does not obtain the encryption public key, thereby further improving the security.

In an embodiment, Steps 201 to 206 are performed by the terminal device.

Step 201: receiving an encryption public key sent by the update server.

The received encryption public key in the embodiment is the encryption public key generated in step 101 of the above-mentioned embodiment, and when implemented, the update server encrypts the update key with the encryption private key.

Step 202: receiving an update key sent by the update server, where the update key is encrypted by the update server with an encryption private key matching the encryption public key.

Furthermore, the terminal device receives the update key sent by the update server, and the update key is encrypted in the update server through the above-mentioned step 103.

Step 203: decrypting the encrypted update key with the encryption public key.

After receiving the encryption public key and the encrypted update key issued by the update server, the update key is decrypted with the encryption public key, so that the decrypted update key can be obtained.

Step 204: receiving update data sent by the update server, where the update data is encrypted by the update server with the update key.

Furthermore, the update data, encrypted by the update server with the update key in the above-mentioned step 105, are received. Since the update data is encrypted, the original file cannot be acquired directly even if the update data is acquired by the unauthorized user in the process of transmission as it is an encrypted file.

Step 205: decrypting the update data with the decrypted update key.

Finally, the update data is decrypted with the decrypted update key to obtain the update data that can be used to perform a data updating.

Step 206: performing a data updating with the update data.

In practice, the current updating operation maybe completed by erasing former data and updating the firmware with an updating program.

As an optional embodiment, after step 205, the method may include the following step:

calculating second integrity check data of the decrypted update data;

performing an integrity check on the update data according to the first integrity data and the second integrity data, where the first integrity check data is generated by the update server according to the update data and sent to the terminal device.

In the present embodiment, the first integrity data is generated by a calculation in the update server according to the update data to be sent, and the second integrity data is generated by a calculation in the terminal device according to the decrypted update data. When the update data is not changed, the first integrity data and the second integrity data should be the same. By comparing the first integrity data with the second integrity data, it is possible to verify whether the update data is changed, so as to avoid the negative influences caused by updating with incorrect update data.

Furthermore, the above step 206 may include:

Performing the data updating with the update data in a case that the update data passes the integrity check.

In the case that the update data passes the integrity check, namely, in the case that the first integrity data and the second integrity data are consistent, it is proved that the update data received by the terminal device is not abnormal, and the update data can be used for the data updating.

Figure 3:
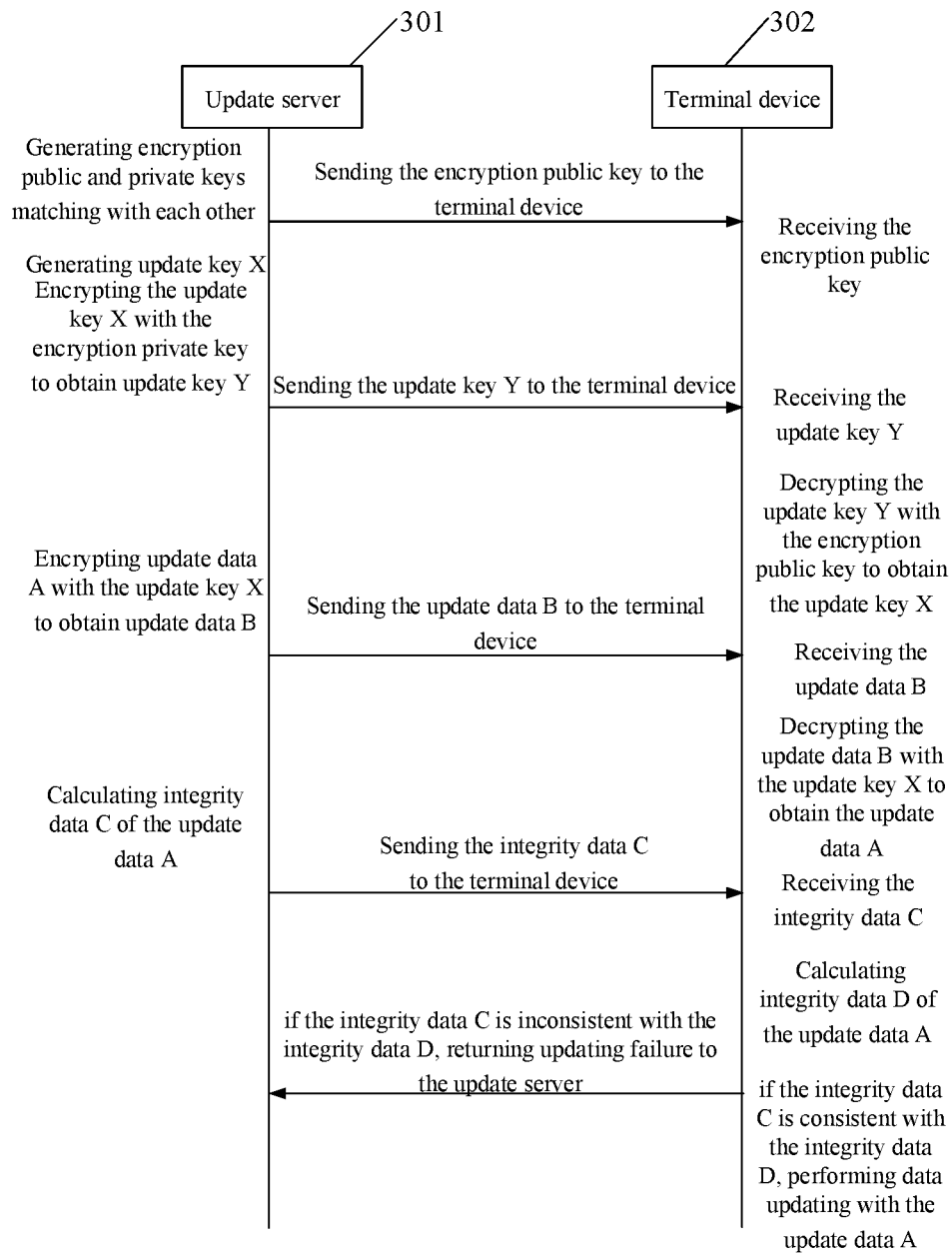
FIG. 3 is yet another flow chart of an OTA update method provided by an embodiment of the present disclosure.
Figure 4:
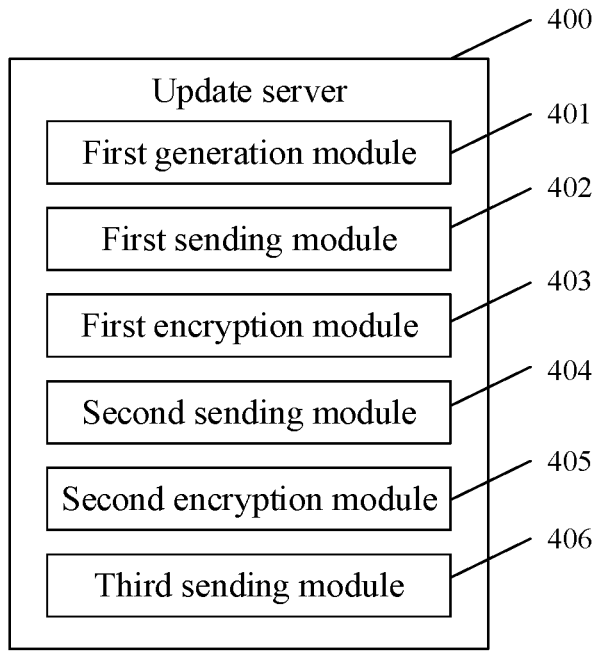
FIG. 4 is a schematic structural diagram of an update server provided by an embodiment of the present disclosure.
Figure 5:
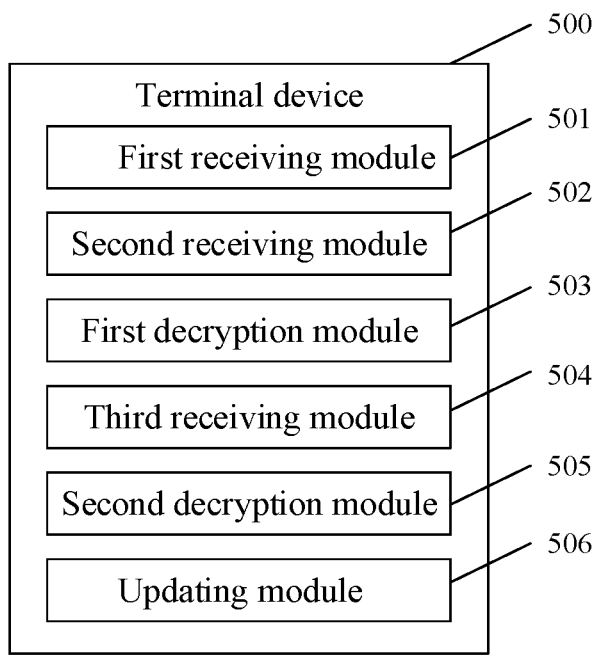
FIG. 5 is a schematic structural diagram of a terminal device provided by an embodiment of the present disclosure.

As shown in FIG. 3, the technical solution of the present embodiment can be summarized as follows. An encryption public key and an encryption private key matching with each other are generated in an update server 301. An update key X is also generated in the update server 301. The update key X is encrypted with the encryption private key to obtain a update key Y. Afterward, the encryption public key and the update key Y are sent to the terminal device 302.

The terminal device 302 decrypts the update key Y with the received encryption public key to obtain the update key X.

Furthermore, in an OTA updating process, data need to be updated is update data A. In the update server 301, the update data A is encrypted with the update key X to obtain update data B.

In addition, integrity data C of the update data A needs to be calculated. Furthermore, the update data B and the integrity data C are sent to the terminal device 302.

After receiving the update data B, the terminal device 302 decrypts the update data B with the update key X to obtain the update data A. Furthermore, in the terminal device 302, integrity data D of the update data A is calculated.

If the integrity data C is consistent with the integrity data D, it is proved that the update data is not abnormal, and the update data can be used for updating data in the terminal device 302. If the integrity data C is inconsistent with the integrity data D, it is proved that the update data is abnormal, and in this case, a update failure is reported to the update server 301, and the updating steps needs to be performed again.

Embodiments of the present disclosure also provide a update server applied to an internet of things system, where the internet of things further includes a terminal device, the update server is communicatively connected to the terminal device, and the update server 400 includes:

a first generation module 401, configured to generate an encryption public key and an encryption private key that match with each other;

a first sending module 402, configured to send the encryption public key to the terminal device;

a first encryption module 403, configured to generate an update key, and encrypt the update key with the encryption private key;

a second sending module 404, which is configured to send the encrypted update key to the terminal device, to cause the terminal device to decrypt the encrypted update key with the encryption public key;

a second encryption module 405, configured to encrypt the update data with the update key; and a third sending module 406, configured to send the encrypted update data to the terminal device, to cause the terminal device to decrypt the update data with the decrypted update key, and perform a data updating with the update data.

Optionally, the update server further includes:

a second generation module, configured to generate first integrity check data corresponding to the update data;

a fourth sending module, configured to send the first integrity check data to the terminal device.

Embodiments of the present disclosure also provide a terminal device applied to an internet of things system, where the internet of things system further includes an update server, and the update server is communicatively connected to the terminal device, and the terminal device 500 includes:

a first receiving module 501, configured to receive an encryption public key sent by the update server;

a second receiving module 502, configured to receive an update key sent by the update server, where the update key is encrypted by the update server with an encryption private key matching the encryption public key;

a first decryption module 503, configured to decrypt the encrypted update key with the encryption public key;

a third receiving module 504, configured to receive update data sent by the update server, where the update data is encrypted by the update server with the update key;

a second decryption module 505, configured to decrypt the update data with the decrypted update key; and an updating module 506, configured to perform a data updating with the update data.

Optionally, the terminal device further includes:

a calculation module, configured to calculate second integrity check data of the decrypted update data;

a check module, configured to perform an integrity check on the update data according to first integrity data and the second integrity data, where the first integrity check data is generated by the update server according to the update data and sent to the terminal device.

Optionally, the updating module 506 is specifically configured to perform the data updating with the update data in a case that the update data passes the integrity check.

Embodiments of the present disclosure also provide an internet of things system including the update server described in any of the above embodiments and the terminal device described in any of the above embodiments.

Since the update server, the terminal device, and the internet of things system of the embodiments can implement various steps in embodiments for the above-mentioned OTA update method, an thus can achieve at least all the technical effects mentioned above, which will not be described in detail here.

The above embodiments are merely specific implementations of the present disclosure, but the protection scope of the present disclosure is not limited thereto, and any modifications and substitutions that are apparent to those skilled in the art without departing from the technical scope of the present disclosure shall fall within the protection scope of the present disclosure. Therefore, the protection scope of the disclosure is set forth in the appended claims.

What is claimed is:

1. An over-the-air updating method, applied to an update server in an internet of things system, wherein the internet of things system includes the update server and a terminal device, and the update server is communicatively connected to the terminal device, and the method includes the following steps:
   generating an encryption public key and an encryption private key that match with each other;
   sending the encryption public key to the terminal device;
   generating an update key, and encrypting the update key with the encryption private key;
   sending the encrypted update key to the terminal device upon receiving a heartbeat packet by the update server from the terminal device, through a persistent connection between the terminal device and the update server;
   sending the encrypted update key to the terminal device, to cause the terminal device to decrypt the encrypted update key with the encryption public key;
   encrypting update data with the update key; and
   sending the encrypted update data to the terminal device, to cause the terminal equipment to decrypt the update data with the decrypted update key, and perform a data updating with the update data.

2. The over-the-air updating method according to claim 1, wherein before sending the encrypted update data to the terminal device, the method further comprises:
   generating first integrity check data corresponding to the update data; and
   sending the first integrity check data to the terminal device.

3. The over-the-air updating method according to claim 1, further comprising: sending the encryption public key to the terminal device upon receiving the heartbeat packet by the update server from the terminal device.

4. An over-the-air updating method, applied to a terminal device in an internet of things system, wherein the internet of things system comprises an update server and the terminal device, and the update server is communicatively connected to the terminal device, and the method comprises the following steps:
   receiving an encryption public key sent by the update server;
   upon sending a heartbeat packet to the update server, receiving an update key sent by the update server through a persistent connection between the terminal device and the update server wherein the update key is encrypted by the update server with an encryption private key matching the encryption public key;
   decrypting the encrypted update key with the encryption public key;
   receiving update data sent by the update server, wherein the update data is encrypted by the update server with the update key;
   decrypting the update data with the decrypted update key; and
   performing a data updating with the update data.

5. The over-the-air updating method according to claim 4, wherein after decrypting the update data with the decrypted update key, the method further comprise:
   calculating second integrity check data of the decrypted update data;
   performing an integrity check on the update data according to first integrity check data and the second integrity check data, wherein the first integrity check data is generated by the update server according to the update data and then sent to the terminal device.

6. The over-the-air updating method according to claim 5, wherein performing the data updating with the update data comprises:
   performing the data updating with the update data in a case that the update data passes the integrity check.

7. The over-the-air updating method according to claim 4, further comprising periodically sending a heartbeat packet to the update server.

8. An update server, applied to an internet of things system, wherein the internet of things system further comprises a terminal device, the update server is communicatively connected to the terminal device, and the update server comprises a processor and a memory, the memory stores instructions, the instructions, when being executed by the processor, cause the processor to perform the following steps:
   generating an encryption public key and an encryption private key that match with each other;
   sending the encryption public key to the terminal device;
   generating the update key, and encrypting the update key with the encryption private key;
   sending the encrypted update key to the terminal device upon receiving a heartbeat packet from the terminal device, through a persistent connection between the terminal device and the update server;
   sending the encrypted update key to the terminal device to cause the terminal device to decrypt the encrypted update key with the encryption public key;
   encrypting update data with the update key; and
   sending the encrypted update data to the terminal device to cause the terminal device to decrypt the update data with the decrypted update key and perform a data updating with the update data.

9. The update server according to claim 8, the steps further comprising:
   generating first integrity check data corresponding to the update data; and
   sending the first integrity check data to the terminal device.

10. The update server according to claim 9, wherein the step of sending the encryption public key to the terminal device comprises: sending the encryption public key to the terminal device upon receiving the heartbeat packet from the terminal device.

11. The update server according to claim 8, wherein the step of sending the encryption public key to the terminal device comprises: sending the encryption public key to the terminal device upon receiving the heartbeat packet from the terminal device.

* * * * *

UNITED STATES PATENT AND TRADEMARK OFFICE
CERTIFICATE OF CORRECTION

| | | |
|---|---|---|
| PATENT NO. | : 12,050,901 B2 | Page 1 of 1 |
| APPLICATION NO. | : 17/778193 | |
| DATED | : July 30, 2024 | |
| INVENTOR(S) | : Hongtao Guan | |

It is certified that error appears in the above-identified patent and that said Letters Patent is hereby corrected as shown below:

On the Title Page

Item [30], should read:
Jun. 23, 2020 (CN)..........................202010582268.6

Signed and Sealed this
Tenth Day of September, 2024

Katherine Kelly Vidal
*Director of the United States Patent and Trademark Office*